Figure 1:
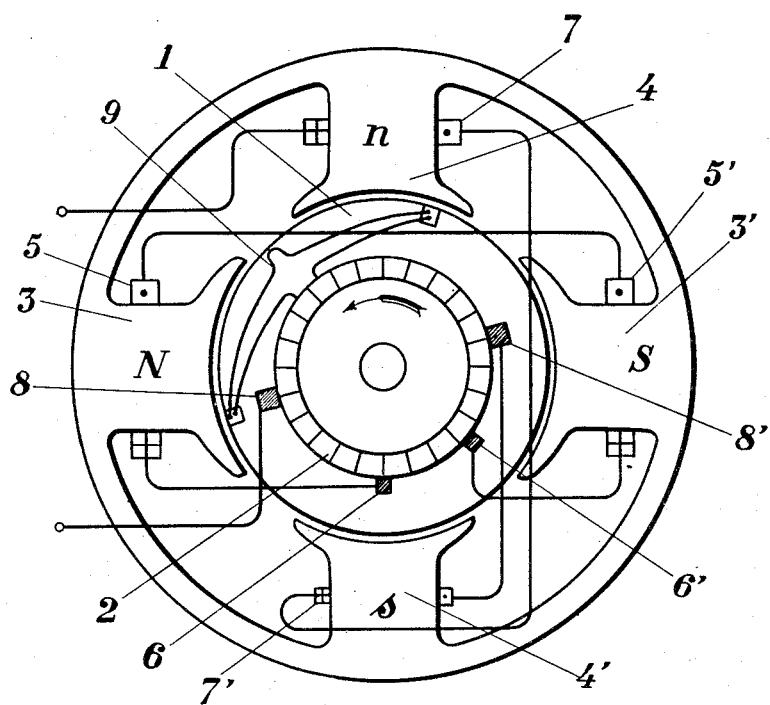

INVENTORS
CHARLES VOLFF, &
BORIS BOGATENKOFF,
BY Stone, Boyden, Mack.
ATTORNEYS

July 14, 1953   C. VOLFF ET AL   2,645,731
DIRECT CURRENT ELECTRIC GENERATOR HAVING A LARGE VOLTAGE DROP
Filed Feb. 8, 1949   3 Sheets-Sheet 3

INVENTORS
CHARLES VOLFF, &
BORIS BOGATENKOFF,
BY Stone, Boyden & Mack
ATTORNEYS

Patented July 14, 1953

2,645,731

UNITED STATES PATENT OFFICE 2,645,731

DIRECT CURRENT ELECTRIC GENERATOR HAVING A LARGE VOLTAGE DROP

Charles Volff and Boris Bogatenkoff, Paris, France, assignors to L'Aire Liquide, Societe Anonyme pour l'Etude et l'Exploitation des Procédés Georges Claude, Paris, France Application February 8, 1949, Serial No. 75,216
In France June 5, 1945

7 Claims. (Cl. 310—186)

This invention relates to direct current generators and it has reference in particular to arc welding generators in which the voltage drop is due to armature reaction. This application is a continuation-in-part of application Serial No. 671,621, filed May 22, 1946.

One object of our invention is to provide a self excited generator of great stability of excitation.

Another object is to provide a generator of drooping characteristic, of extremely reduced inertia of operation and excellent transient characteristics.

Other objects will in part be obvious and in part be described hereinafter. The attendant disclosure relates to a generator with a two pole armature for the sake of simplicity, but it will be easily applied to a generator with a $2n$ poles armature.

In accordance with our invention, a generator is provided on one hand with an armature with a lap winding with short pitch and a large number of ampere-turns per centimetre of peripheral length, and with a commutator with load brushes and auxiliary brushes, on the other hand with a field structure which, if the armature is of the two-poles type, provides:

(1) Two main poles provided with exciting windings, uniformly distributed or not, supplied by the auxiliary brushes, these brushes being placed on the commutator at points which are so chosen that the potential difference between said brushes remains approximately constant or increases slightly when the load of the generator increases.

(2) Two interpoles, one of which produces a stronger magnetic flux than the other. Each exciting winding of the auxiliary poles is serially connected with the load, but may be shunted by a branch circuit if it is wanted to have only a portion of the load current flowing through it.

Both main poles, and one of the interpoles, are embodied in a field pole piece, but the other interpole may be embodied, or not, in a field pole piece. When it is not, the lines of flux issuing from the other interpole, instead of coming back to this pole through an interpole piece and the frame of the field structure, come back through the main pole piece of the same polarity as that of the non-embodied interpole and then through the frame.

The air gap beneath the entire surface of each field pole piece is constant and is of the same order of magnitude beneath every main and interpole piece.

It has been discovered that the difference in the flux of the interpoles improves the transient characteristics of the generator. In addition, combined with the short pitch, it enables an excitation voltage to be obtained on suitably set auxiliary brushes which is constant or increases slightly when the load increases, and particularly which does not drop with the load for certain settings of the load brushes, for instance for weak currents.

If the armature has $2n$ poles, similar arrangements are used for the field structure which provides then $2n$ main poles and $2n$ interpoles, one interpole and only one being placed between two successive main poles; as is usual for generators having an armature with more than two poles, every main pole of the same polarity has pole pieces of the same dimensions and the same number of turns in its exciting windings, the same being true of the interpoles.

Several means may be employed for making the poles of one set of $n$ interpoles, of one and same polarity, produce a stronger magnetic flux than the other interpoles.

(1) The exciting windings of the interpoles of one set may have a greater number of turns than the exciting windings of the interpoles of the other set.

(2) The exciting windings of the interpoles of one set may be flown through by a fraction of the load current, this fraction being smaller than the current flowing through the exciting windings of the interpoles of the other set.

(3) Each of the interpoles of one set may comprise a field pole piece but be devoid of any exciting winding.

(4) The magnetic section of the pole pieces of the interpoles of one set may be, at least locally, smaller than that of the pole pieces of the interpoles of the other set.

(5) The air gap between the armature and the pole pieces of one set of interpoles may be broader than the air gap between the armature and the pole pieces of the other set.

(6) Each of the interpoles of one set may comprise neither a field pole piece, nor an exciting winding.

The regulation of the armature current of the generator is effected either by shifting the main brushes, or by adjusting the excitation by means, for example, of a rheostat, or preferably by a combination of both these means.

In the drawing, Figures 1, 2, 3, 4, are schematic representations of generators according to our invention and the armature of which has 2 poles.

These generators differ by the means employed for making the flux issuing from one of the interpoles stronger than that issuing from the other interpole.

Referring to Figure 1, 1 is the short pitch armature of the generator, only one turn of which is shown at 9, 2 the commutator, 3 and 3' the main poles, 4 and 4' the interpoles having the same air gap as the main poles and 12 the frame. The exciting windings 5 and 5' of the main poles 3 and 3' are connected to the commutator 2 by auxiliary brushes 6 and 6' with a fixed setting.

This setting, effected easily and once for all at the factory during a trial run, is such, for example, that the voltage between these auxiliary brushes is about 20% higher when the generator is short circuited than during its no load running. This overvoltage is that which is obtained when the main brushes are set in the position giving the nominal current of the generator; when the main brushes are set for weaker currents, this overvoltage is lesser and can almost be reduced to zero if they are set for very weak currents. A rheostat (not shown) is in general connected in the excitation circuit. The interpole 4 is excited by a winding 7 and the interpole 4' by a winding 7' comprising a smaller number of turns than 7. The windings 7 and 7' are serially connected with each other and with the load, the armature current for this load being collected by the main brushes 8 and 8'. The setting of these brushes is variable with the desired load.

Figure 2:
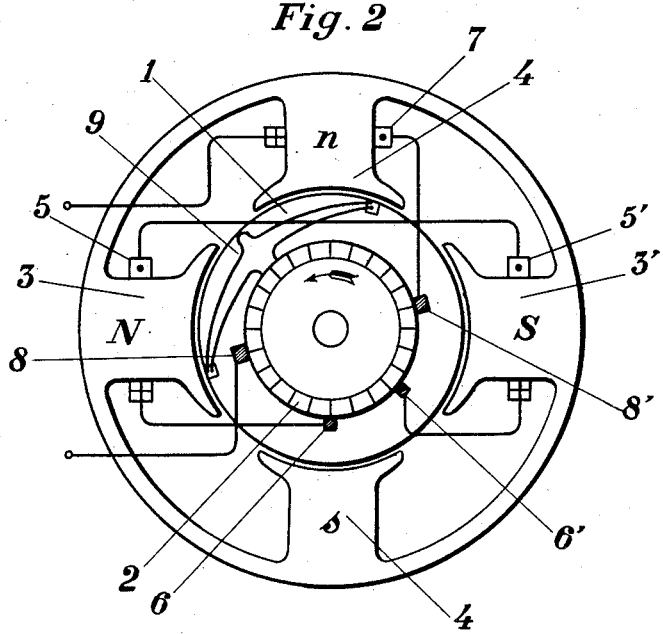

Referring to Figure 2, the pole piece 4' of this embodiment is not provided with an exciting winding, which results in a greater dissymmetry of the field produced by the interpoles than in the above embodiment. The other parts of the generator are similar to those of this above embodiment. (Figure 1.) This embodiment may be considered as a limit case of the preceding, the number of turns of the winding 7', which must be smaller than that of the winding 7, being brought to zero, which is the smallest number.

Figure 3:
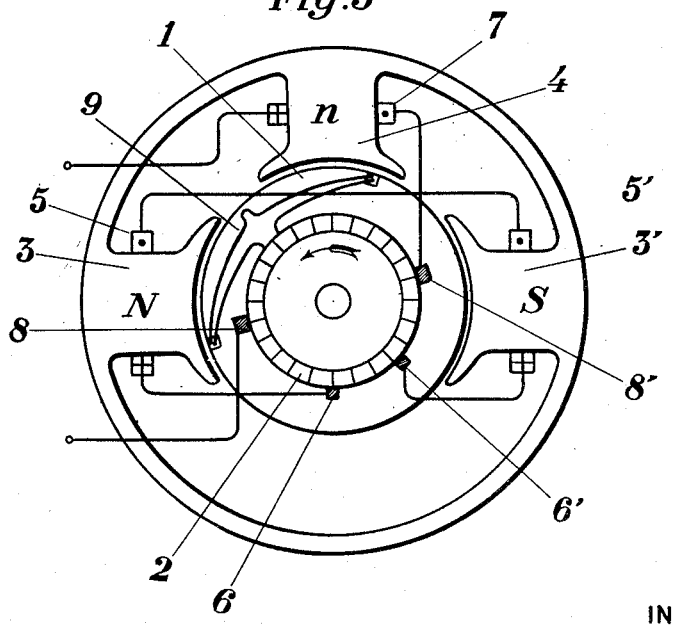

Referring to Figure 3, there is no other pole piece 4', which introduces still greater a dissymmetry of the field produced by the interpoles. The field produced by the interpole 4 closes through the pole pieces 3' and the frame 12.

Figure 4:
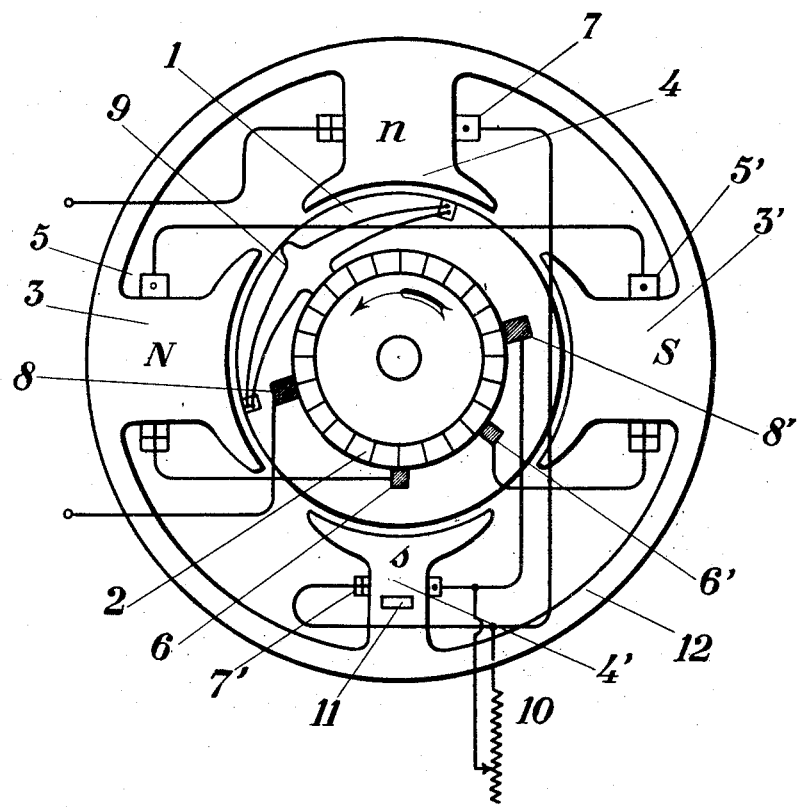

Referring to Figure 4, the interpole 4' is provided with a pole piece and with an exciting winding 7'. The pole piece has a smaller magnetic section than that of the interpole 4 along most of its length, but its shoe has the same surface as that of the latter; its magnetic section is locally constricted by a notch 11, which results in a local saturation of the pole piece 4', beneficial for the transient characteristics.

The air gap between the pole piece 4' and the armature 1 is substantially broader than that between the pole piece 4 and the armature, but is still of the same order of magnitude.

The exciting winding 7' has a smaller number of turns than the winding 7 and is shunted by a variable resistor 10, so that the excitation for the interpole 4' is lesser than that for the interpole 4.

The above differences between the interpoles 4 and 4' result in the magnetic flux issuing from the first being much stronger than that issuing from the second, which gives excellent transient characteristics.

It is not generally necessary, however, to make use of all these differences in the same machine; a small number of these differences, or even one only, is generally sufficient. The appended claims specify armatures with one pair of poles only. It is understood that they also cover the cases in which the armature has $n$ pairs of poles, $n$ being an integer number greater than 1, it being conventional to infer from the design of a machine with a two poles armature, the design of a machine with a $2n$ poles armatures.

What we claim is:

1. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, at least one of said interpoles comprising a field pole piece and an exciting winding, a pair of load brushes diametrically opposite each other bearing upon said commutator and including the load circuit of said generator and the exciting winding of at least one of said interpoles, a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, one of said interpoles when its exciting winding is traversed by the load current producing a weaker magnetic flux than the other interpole, the windings of said main poles being serially connected and fed by the voltage given by said auxiliary brushes, the interpole which produces the strongest magnetic flux being connected serially with the load circuit of said generator, the air gap beneath the entire surface of each field pole piece being constant and being of the same order of magnitude beneath all of the field pole pieces.

2. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, each of said interpoles comprising a field pole piece and an exciting winding, a pair of load brushes diametrically opposite each other bearing upon said commutator and including the load circuit of said generator and the exciting winding of each of said interpoles; a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, the exciting winding of one of said interpoles having a smaller number of turns than the exciting winding of the other interpole and when traversed by the load current producing a weaker magnetic flux than the other interpole, the windings of said main poles being serially connected and fed by the voltage given by said auxiliary brushes, the interpole which produces the strongest magnetic flux being connected serially with the load circuit of said generator, the air gap beneath the entire surface of each field pole piece being constant and being of the same order of magnitude beneath all of the field pole pieces.

3. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, a pair of load brushes diametrically opposite each other bearing upon said commutator and including the load circuit of said generator and the exciting winding of each of said interpoles; a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, the exciting winding of one of said interpoles having a smaller number of turns than the exciting winding of the other interpole and when traversed by a fraction of the load current producing a weaker magnetic flux than the other interpole, this fraction being smaller than the current flowing through the exciting winding of the other interpole, the windings of said main poles being serially connected and fed by the voltage given by said auxiliary brushes, the air gap beneath the entire surface of each field pole piece being constant and being of the same order of magnitude beneath all of the field pole pieces.

4. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, each of said interpoles comprising a field pole piece but only one of them being provided with an exciting winding, the other interpole being devoid of any exciting winding, a pair of load brushes diametrically opposite each other bearing upon said commutator and including the load circuit of said generator and the exciting winding of but one of said interpoles; a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, the exciting winding of said interpole when traversed by the load current producing a stronger magnetic flux than the other interpole, the windings of said main poles being serially connected and fed by the voltage given by said auxiliary brushes, the interpole which produces the strongest magnetic flux being connected serially with the load circuit of said generator, the air gap beneath the entire surface of each field pole piece being constant and being of the same order of magnitude beneath all of the field pole pieces.

5. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, each of said interpoles comprising a field pole piece and an exciting winding, the magnetic section of the pole piece of one of said interpoles being, at least locally, smaller than that of the pole piece of said other interpole, a pair of load brushes diametrically opposite each other bearing upon said commutator and including the load circuit of said generator and the exciting winding of each of said interpoles; a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, the exciting winding of one of said interpoles having a smaller number of turns than the exciting winding of the other interpole and when traversed by the load current producing a weaker magnetic flux than the other interpole, the windings of said main poles being serially connected and fed by the voltage given by said auxiliary brushes, the interpole which produces the strongest magnetic flux being connected serially with the load circuit of said generator, the air gap beneath the entire surface of each field pole piece being constant and being of the same order of magnitude beneath all of the field pole pieces.

6. A direct current arc-welding generator in which the volttage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole and an exciting winding, at least one of said interpoles comprising a field pole piece and an exciting winding, a pair of load brushes diametrically opposite each other bearing upon said commutator and including the load circuit of said generator and the exciting winding of at least one of said interpoles, a pair of auxiliary brushes bearing upon said commutator and positioned at points entirely on one side of the diameter joining said load brushes and in spaced relation to said load brushes said points being so chosen that the potential differences between said auxiliary brushes should remain approximately constant or increase slightly should the load upon said generator increase, one of said interpoles when its exciting winding is traversed by the load current producing a weaker magnetic flux than the other interpole, the windings of said main poles being serially connected and fed by the voltage given by said auxiliary brushes, the interpole which produces the strongest magnetic flux being connected serially with the load circuit of said generator, the air gap between the armature and the pole piece of one of said interpoles being broader than the air gap between the armature and the other interpole, and the air gap beneath the entire surface of each field pole piece being constant and being of the same order of magnitude beneath all the field pole pieces.

7. A direct current arc-welding generator in which the voltage drop is due to armature reaction, comprising in combination, a bipolar armature having a short pitch winding and provided with a commutator, a field structure providing a pair of main poles diametrically opposite each other and two interpoles diametrically opposite each other and equally spaced with reference to said main poles, each main pole comprising a field pole piece and an exciting winding, one of said interpoles comprising a field pole piece and an exciting winding, a pair of load brushes diametrically opposite each other bearing upon said commutator and including the load circuit of said generator and the exciting winding of said interpole, the other interpole being devoid of a field pole piece and of an exciting winding, a pair of auxiliary brushes bearing upon said commutator and positioned at points entirely on one side of the diameter joining said load brushes and in spaced relation to said load brushes said points being so chosen that the potential difference between said auxiliary brushes should remain approximately constant or increase slightly should the load upon said generator increase, the exciting winding of said interpole being connected serially with the load circuit of said generator and when traversed by the load current producing a stronger magnetic flux than the other interpole, the windings of said main poles being serially connected and fed by the voltage given by said auxiliary brushes, the air gap beneath the entire surface of each field pole piece being constant and being of the same order of magnitude beneath all of the field pole pieces.

CHARLES VOLFF.
BORIS BOGATENKOFF.

References Cited in the file of this patent

UNITED STATES PATENTS

| Number | Name | Date |
|---|---|---|
| 1,237,272 | Arendt | Aug. 21, 1917 |
| 1,694,062 | Hansen | Dec. 4, 1928 |
| 1,701,362 | Haddrell | Feb. 5, 1929 |
| 1,814,061 | Sarazin et al. | July 14, 1931 |
| 2,378,894 | Blankenbuehler | June 26, 1945 |

FOREIGN PATENTS

| Number | Country | Date |
|---|---|---|
| 176,091 | Switzerland | June 17, 1935 |